No. 783,826. PATENTED FEB. 28, 1905.
G. DINKEL.
OPEN SPRINKLER FOR PROTECTION AGAINST FIRE.
APPLICATION FILED APR. 14, 1904.

Witnesses:
D. W. Gardner.
James A. Wilson.

Inventor:
George Dinkel
By his Attorney
Geo. W. Miatt

No. 783,826. Patented February 28, 1905.

UNITED STATES PATENT OFFICE.

GEORGE DINKEL, OF JERSEY CITY, NEW JERSEY.

OPEN SPRINKLER FOR PROTECTION AGAINST FIRE.

SPECIFICATION forming part of Letters Patent No. 783,826, dated February 28, 1905.

Application filed April 14, 1904. Serial No. 203,156.

*To all whom it may concern:*

Be it known that I, GEORGE DINKEL, a citizen of the United States, residing in Jersey City, Hudson county, and State of New Jersey, have invented certain new and useful Improvements in Open Sprinklers for Protection Against Fire, of which the following is a specification sufficient to enable others skilled in the art to which the invention appertains to make and use the same.

My invention relates more particularly to nozzle-sprinklers for distributing a liquid over the external surface of buildings for protection against fire, although applicable to other situations and conditions of use.

One object is to protect the discharge-orifice from obstruction; another, to insure an effective and even distribution of the liquid discharged.

While not desiring to limit myself thereto, I herein consider and describe my improved sprinkler as applied for use in connection with a system of stand and branch pipes arranged to protect the windows or walls of a building externally. Heretofore trouble has resulted from the clogging up or obstruction of the discharge-orifices of such nozzles either by reason of the collection within or around such orifices of extraneous matter or by the collection and freezing of rain-water with the nozzle and connections. I obviate these difficulties and afford a nozzle or sprinkler ready for immediate service in emergency in any weather and under all conditions by my invention, which consists in a nozzle formed and constructed substantially as hereinafter described and claimed specifically, with a deflecting and protecting hood and with a discharge-orifice through a plane or surface inclined rearward with relation to the axis of discharge, so as to guide extraneous matter away from said orifice.

Figure 1:
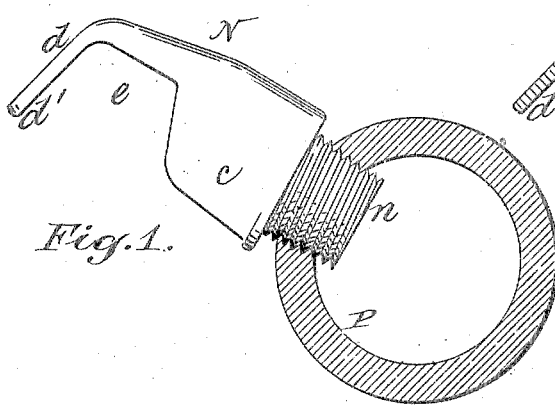
Figure 3:
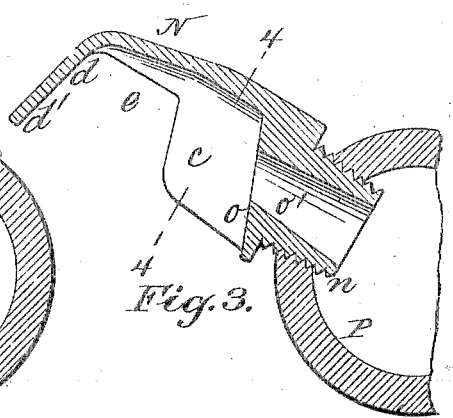
Figure 2:
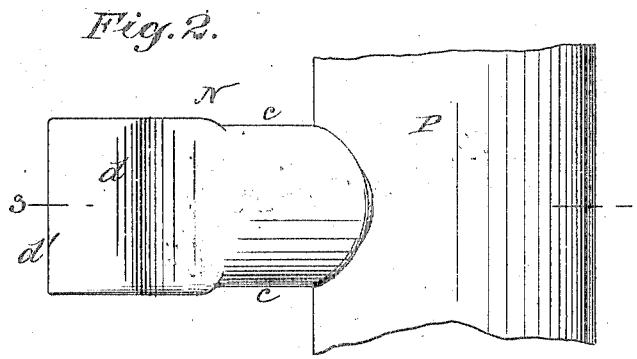
Figure 4:
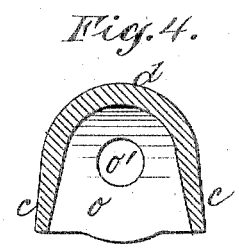
Figure 5:
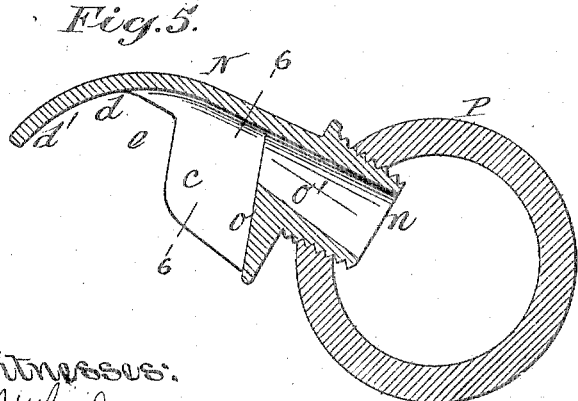
Figure 6:
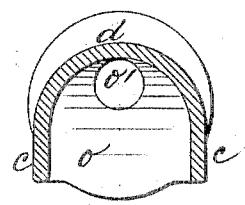

In the accompanying drawings, Figure 1 is a section of a horizontal branch pipe of a system, showing one of my improved nozzles in elevation. Fig. 2 is a plan of the same and the adjoining portion of pipe broken away. Fig. 3 is a vertical section taken upon plane of line 3 3, Fig. 2. Fig. 4 is a transverse section taken upon plane of line 4 4, Fig. 3. Fig. 5 is a view similar to Fig. 3, showing a modification; Fig. 6, a transverse section upon plane of line 6 6, Fig. 5.

In use my improved sprinkler N is preferably set so as to take the water from the side of the pipe just above the center thereof and so that the tangential discharge of liquid from the concave inner surface of the deflector $d$ is at a slight angle to the surface to be protected. This is accomplished by tapping the pipe P for the reception of the nipple $n$ at a suitable angle or by the adjustment of the pipe upon its longitudinal axis.

Integral with and dependent from the sides of the deflector $d$ and constituting therewith a hood are the side or cheek pieces $c$ $c$, between which and the outer extremity of the deflector $d$ are formed the openings $e$ $e$ for the lateral discharge of the liquid.

The rear wall or lateral face $o$ of the nozzle, through which the discharge-orifice $o'$ opens, is formed at an angle with relation to the axis of the discharge-passage $o'$, the inclined surface thus produced projecting downward and rearward, so that it will tend constantly to guide dust and other extraneous matter away from said discharge-orifice $o'$.

In the first four figures of the drawings the liquid escaping under pressure through the orifice $o'$ impinges against the outer extremity or tongue $d''$ of the deflector $d$ and is thereby diverted in the form of a sheet of spray which strikes the side of the building or other surface to be protected below the nozzle, which is usually arranged a few inches from such surface. In the preferred form shown in Figs. 5 and 6 the under surface of the deflector $d$, with that of its tongue $d''$, forms approximately a concave parabolic curve of which the edge of the tongue $d''$ is the vortex and the liquid controlled and guided immediately upon leaving the orifice $o'$ and until discharged from the nozzle, the result being substantially the same in either case, except that in the latter form a more uniformly-distributed unbroken sheet of spray is discharged continuously from the nozzle, since the reaction consequent to the impact of the liquid with the deflecting-surface is neutralized, the change of direction being effected gradually and uniformly.

It will be seen that by my construction I inclose and cover the discharge-orifice $o'$ to all intents and purposes with a hood consisting of the deflector $d\,d'$ and check-pieces $e\,e$, which hood sheds the rain and snow and excludes extraneous matter generally. The collection and freezing of rain-water within the nozzle is practically impossible, as would be the lodgment of any foreign matter within the hood, the internal side walls of which are sufficiently inclined to afford no lodgment or support for either liquid or solid matter.

What I claim as my invention, and desire to secure by Letters Patent, is—

1. The combination with a pipe, of an open sprinkler secured thereto with the discharge from said pipe through the sprinkler at an angle to the surface to be protected, said sprinkler having depending side pieces forming a hood, and a flat downwardly-inclined deflector at the outer end of said sprinkler with side discharge-openings for the lateral discharge of the liquid between said hood and deflector.

2. A supply-pipe, and a sprinkler secured therein at an angle to the surface to be protected, said sprinkler having side pieces extending below the opening through the sprinkler and a downwardly extending and inclined tongue at its outer end with openings for the lateral discharge of the liquid between said side pieces and tongue.

GEORGE DINKEL.

Witnesses:
D. W. GARDNER,
GEO. WM. MIATT.